United States Patent [19]
Barber et al.

[11] Patent Number: 6,111,711
[45] Date of Patent: Aug. 29, 2000

[54] FAST CHARGE AND THERMAL ASPERITY COMPENSATION CIRCUIT

[75] Inventors: Earl J. Barber, Essex Junction, Vt.;
Gregg R. Castellucci, Plattsburgh, N.Y.

[73] Assignee: International Business Machines Corp., Armonk, N.Y.

[21] Appl. No.: 09/138,960

[22] Filed: Aug. 24, 1998

[51] Int. Cl.[7] .................................................. G11B 5/09
[52] U.S. Cl. ........................ 360/46; 360/67; 360/25; 360/66; 360/65
[58] Field of Search ........................ 360/67, 46, 25, 360/66, 65; 330/138, 259, 289, 290; 327/545

[56] References Cited

U.S. PATENT DOCUMENTS

| | | | |
|---|---|---|---|
| 5,812,019 | 9/1998 | Ngo et al. | 360/67 |
| 5,923,216 | 7/1999 | Pennock | 360/67 |
| 5,986,840 | 11/1999 | Tada et al. | 360/67 |

*Primary Examiner*—Alan T. Faber
*Attorney, Agent, or Firm*—Thornton & Thornton; David R. Thornton; Robert A. Walsh

[57] ABSTRACT

An MR head circuit including a differential amplifier, means for applying a dc bias to the head, a capacitor mounted in parallel to the head to eliminate the dc voltage offset, and a feedback loop configured for evaluating the differential voltage and for controlling the current in portions of the amplifier to rapidly charge the capacitor upon circuit activation. The feedback loop also includes a thermal asperity compensator configured for producing a given signal, both upon activation of the circuit and when the magnitude of the voltage differential exceeds a given value, and the feedback loop includes means responsive to the given signal for altering select current paths of the feedback loop to thereby produce elevated charging currents in the differential amplifier during initial activation, and to increase the ac gain of the feedback loop at other times so as to raise the lower corner frequency of the differential amplifier to filter out the relatively low frequency of a thermal asperity waveform. The feedback loop includes current paths for developing difference currents representing the differential output voltage, and each path is coupled to the differential amplifier for controlling it, and the current paths include a shunt transistor operative for altering the resistance of the current paths and the ac gain of the current network responsive to the given signal.

15 Claims, 3 Drawing Sheets

FAST CHARGE AND THERMAL ASPERITY COMPENSATION CIRCUIT

FIELD OF THE INVENTION

This invention relates generally to circuits for operating magneto-restrictive heads, and more particularly to head reading circuits providing fast capacitor charge and thermal asperity compensation.

BACKGROUND OF THE INVENTION

In computer data storage and retrieval systems, magneto-resistive heads, otherwise known as MR heads, are employed for reading data from a storage disk. The magnetically stored data is read by means of the change in resistance of the MR head as it passes through the magnetic field representing the data. For monitoring the varying resistance of the head, a dc bias current is passed through the head. However, this presents a dc offset to the amplifier of the head circuit, and to reduce this effect and provide suitable amplification of data signals, a capacitor is employed to reduce the dc voltage offset.

The large size of the capacitor, however, results in its relatively slow charging such that a large dc bias is present at the input of the amplifier when the head is switched to its read state. In turn, this large signal saturates the amplifier and causes it to clip the data signals. Hence, in the above described prior art circuit, data is substantially unavailable from the disk during the relatively extended time of charging of the capacitor.

Additionally, thermal asperities such as those which occur when the head strikes the disk, also result in a reading failure. The head striking the disc produces a rapid rise in head temperature, followed by a delayed return to normal, due to the slow dissipation of heat from the head. Since the resistance of the head is related to its temperature, the voltage at the input to the amplifier rises rapidly and then decays slowly when a thermal asperity occurs. As can be expected, this large signal tends to both distort the data signal and also clip the signal from the amplifier such that retrieval of data from the disk is essentially lost during this interval of increased head temperature.

SUMMARY OF THE INVENTION

Broadly, the present invention comprises a read circuit for an MR head providing rapid differential recovery of the circuit during initial activation to the read mode and also following thermal asperities. In accordance with the invention, the circuit includes a differential amplifier arranged for coupling to a magneto-resistive head; means for applying a dc bias current to the head for producing data signals in the differential amplifier responsive to variations in head resistance; a blocking capacitor coupled to the differential amplifier for eliminating the voltage offset of the bias current once the capacitor is fully charged; and a feedback loop configured for evaluating the voltage differential in the circuit and for controlling the current in at least portions of the differential amplifier so as to provide rapid differential recovery during initial circuit activation, and also when a thermal asperity occurs.

The feedback loop includes a thermal asperity compensator configured for producing a given signal when the magnitude of the voltage differential exceeds a given threshold value, means responsive to that signal for raising the lower corner frequency of the filter comprising the differential amplifier to filter out the low frequencies associated with a thermal asperity, and further includes timed means for also triggering the given signal during initial activation of the circuit to thereby rapidly charge the capacitor during that activation.

Accordingly, it is an object of the present invention to provide a read circuit for an MR head having rapid differential voltage recovery.

Another object of the present invention is to provide an MR head circuit providing fast charging of its capacitor upon initiation of operations.

Still another object of the present invention is to provide an MR head circuit providing thermal asperity compensation.

These and other objects and features of the present invention will become further apparent from the following description taken in conjunction with the drawings.

DESCRIPTION OF THE PREFERRED EMBODIMENT

Figure 1:
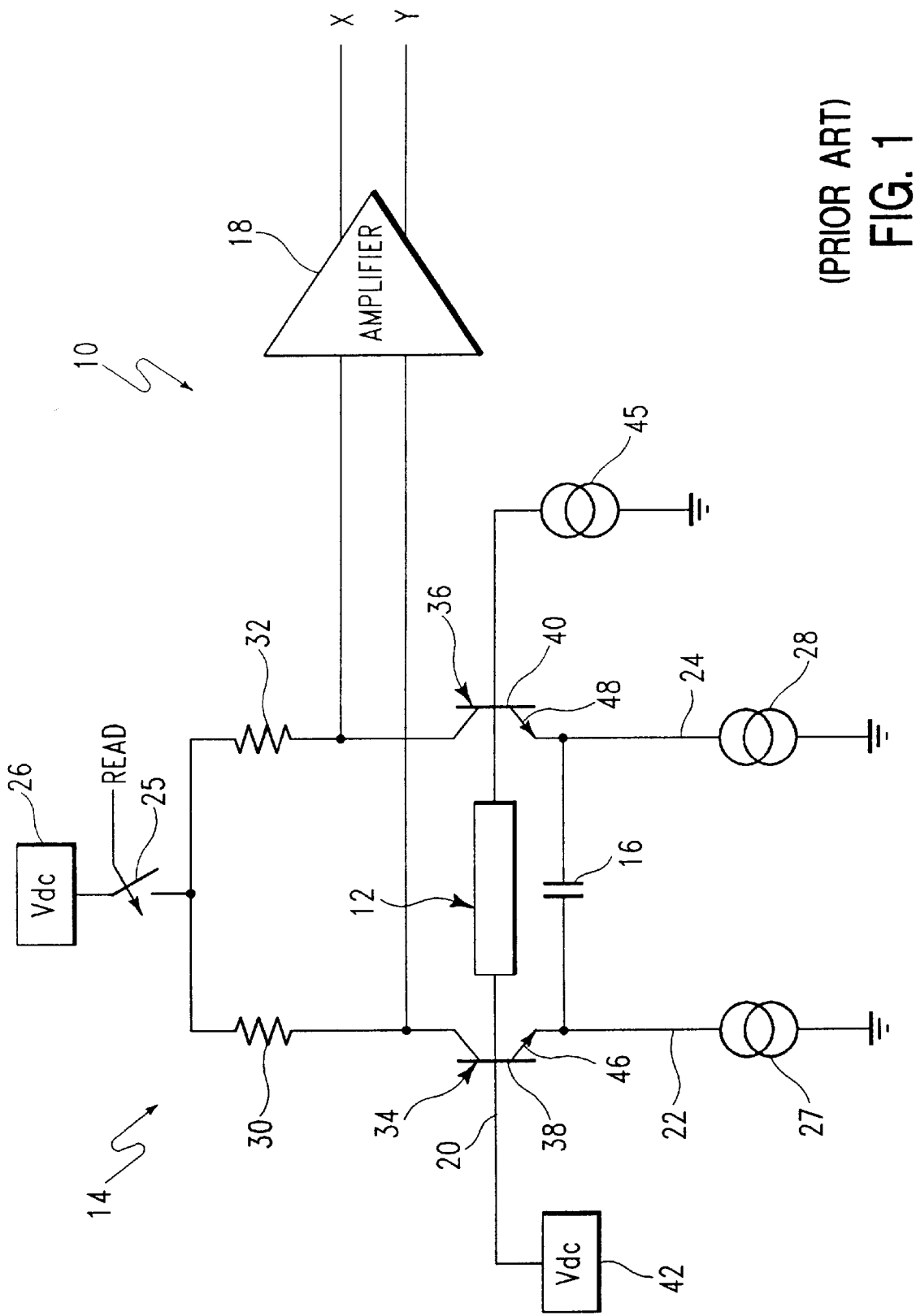
FIG. 1 is a circuit diagram partially in block diagram form of a prior art read circuit for an MR head.

FIG. 1 shows a prior art circuit 10 for reading stored data by means of an MR head 12 wherein the circuit includes a differential amplifier 14, a capacitor 16, an amplifier 18 and a path 20 for biasing the head. The differential amplifier 14 is a conventional network comprising two parallel and identical paths 22, 24, commonly energized at one end by a low voltage source 26 and each separately grounded at the other end by the sinks 27 and 28. The differential paths 22, 24 consist of a pair of resistors 30, 32 and NPN transistors 34, 36, respectively, with the path 22 having resistor 30 connected in series from the source 26 through transistor 34 and ultimately to the sink 27, whereas the resistor 32 in path 24 is connected in series with transistor 36 and through it to the sink 28, as shown. A switch 25, connected between the source 26 and the differential amplifier 14 and operable in accordance with a read signal represents any of the well known arrangements for initiating activation of the circuit 10 to its read mode.

The head 12 is connected across the paths 22, 24, between the bases 38, 40 of the transistors 34, 36, respectively, and is provided with a dc current bias through the path 20 which extends from a dc voltage source 42 to the base 38 of transistor 34 and through the head 12 to the base 40 of transistor 36, and then to a current sink 45. To complete the differential amplifier 14, the capacitor 16 is connected to the emitters 46 and 48 of transistors 34 and 36 respectively.

Finally, the input to amplifier 18 is connected to the ground side of the resistors 30, 32 in paths 24, 26 of differential amplifier 14 to receive the differential voltage therefrom and input the same to the amplifier 18. In turn, amplifier 18 amplifies the received signals and delivers them to a pair of output lines designated in FIG. 1 as X and Y.

As previously noted, the head 12 is dc biased to facilitate detection of the resistive change in the head, as the latter passes through the field of a storage disk (not shown) during relative movement between the head and disk, and the capacitor 16 is provided to eliminate the dc offset. However, when the MR head is switched to its reading mode, the capacitor 16 charges slowly such that a large signal is initially present across the differential paths 22, 24, and this essentially precludes data recovery at that time. Additionally, there is no provision is this prior art circuit for controlling effects resulting from the occurrence of thermal asperities.

Figure 2:
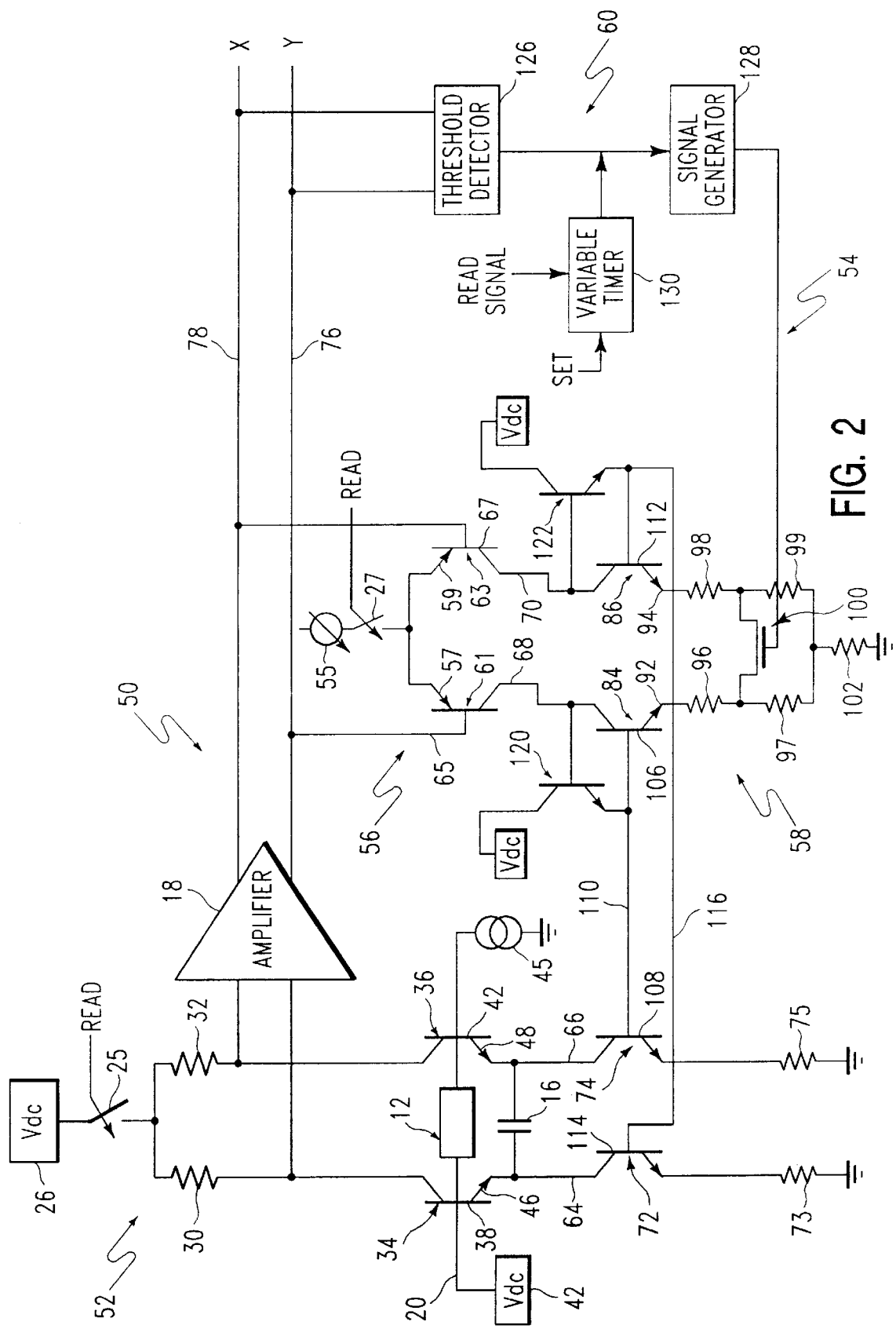
FIG. 2 is a circuit diagram partially in block diagram form of a reading circuit for an MR head provided in accordance with the invention.

In the preferred embodiment shown in FIG. 2, a read circuit 50 is illustrated as including the head 12 and the capacitor 16 carried within a differential amplifier 52 with the output of the latter connected, in turn, to the amplifier 18. The circuit further comprises a compensating, or feedback loop 54 which includes a feedback network 56, a current network 58 and a thermal asperity compensator 60.

As subsequently explained, while the differential amplifier 52 basically operates in similar fashion to that of differential amplifier 14 of FIG. 1, it is modified in circuit 50 to allow its control by the feedback loop 54. Thus, in similar fashion to amplifier 14, the substantially identical paths 64, 66 of the differential amplifier 52 respectively include the resistors 30, 32 and NPN transistors 34, 36 connected in series. Further, the head 12 and the path 20, for applying a dc bias to the head, are connected through the transistors 34, 36, with the capacitor 16 connected between the emitters 46, 48 of the latter. However, unlike the differential amplifier 14, a pair of NPN transistors 72 and 74 and resistors 73, 75 provide current sinks in the paths 64, 66. Thus, the differential amplifier 52 comprises two parallel and identical paths 64, 66, energized by the low voltage source 26 and grounded through separate current sinks. Similar to the prior art circuit 14, the circuit is illustrated as switchable to its read mode by means of the switch 25, connected between the source 26 and the remainder of the differential amplifier 52, and operable in accordance with a "read" signal for activating the inventive circuit to its read mode.

As will later be explained in detail, the feedback loop 54 provides dc voltage control to rapidly charge the capacitor during initial activation of the circuit to its read state, and the dc control is then maintained subsequent thereto. However, once the initial charging is complete, ac control takes on more importance in order to provide recovery from a thermal asperity. Furthermore, as will be subsequently understood, select portions of the feedback loop are utilized in common for both of these activities.

As indicated previously, the feedback loop 54 includes the feedback network 56, and the latter, in turn, comprises a conventional current source 55 which, through a read switch 27, provides a reference current in common to the emitters 57 and 59, respectively, of a pair of PNP transistors 61, 63. The bases 65, 67 of the transistors 61 and 63 are connected respectively to a pair of output lines 76, 78 of the amplifier 18 such that the difference current passed by these transistors is representative of the differential output of amplifier 18. Since the transistors 61, 63 are driven from a common current source, it is to be understood that the sum of the currents through these transistors will essentially be constant. It is also to be noted that other arrangements for developing representative difference currents may also be useful.

The current network 58, in turn, comprises a pair of substantially identical, current paths 68, 70, with the path 68 connected to the collector of a the transistor 61, and the path 70 connected to the collector of the transistor 63 such that the difference current in each respective path 68 and 70, will track the voltage difference in the output of amplifier 18. Hence, the feedback network 56 provides a difference current in each of these current paths which represents the dc voltage difference at the output of the differential amplifier 52.

Each of the current paths 68, 70 are coupled, in turn, to a respective one of the differential amplifier paths 66, 64 to make its associated differential path a current mirror thereof. To accomplish the latter, the current path 70 includes an NPN transistor 86 connected to the transistor 72 in path 64 such that the path 70 and the path 64 provide a first current mirror; with the path 70 being the master and the path 64 being the slave. Similarly, the current path 68 includes an NPN transistor 84 connected to transistor 74 in path 66 such that the path 66 and path 68 together form a second current mirror; with the path 68 being the master and the path 66 being the slave.

Specifically, the coupling of the current paths 68, 70 to the differential amplifier paths 66 and 64 is accomplished by connection of the base 106 of transistor 84 to the base 108 of transistor 74 through a conductor 110, and the base 112 of transistor 86 connected to the base 1 14 of transistor 72 by means of a conductor 1 16 to make the associated paths current mirror networks. Consequently, each of the transistors 72, 74 are driven as part of a different pair of current mirrors to thereby control current flow in the differential paths 64, 66 in accordance with, or in tracking with, the difference currents in the current paths 70 and 68, respectively.

To facilitate thermal asperity compensation, as later explained in detail, transistors 84, 86 of the paths 68 and 70 have their emitters 92, 94 connected through a pair of resistors 96, 98, respectively, to an FET transistor 100 which bridges both paths. This transistor 100 operates as a controllable shunt switch, or shunt transistor, and is normally conductive so as to shunt the paths 68 and 70 at its connection thereto, except when signaled otherwise.

From the transistor 100, the paths 68 and 70 continue in connection to the series resistors 97, 99, respectively, and the latter are connected in common to a ground through resistor 102. Additionally, the current paths 68, 70 also include NPN transistors 120, 122 connected to their respective current paths and to transistors 84 and 86 in a conventional manner to reduce Beta errors of the transistors of the current mirrors.

In operation, when the circuit 50 is activated to its reading mode by closing of the switch 25 and the switch 27, the capacitor 16 begins to charge and the dc voltage difference at the output of the differential amplifier 52 (through resistors 30, 32) will be rather large. This creates a large differential signal at the output of amplifier 18 which, in turn, forces the difference currents in the current paths 68, 70 to clip. Hence, the entire reference current of the current source 55 will essentially flow in the current path 68, and none in the path 70. Consequently, this will essentially turn the transistor 74 (in the mirror path 64) fully on, and at the same time, the zero current in path 70 will essentially turn off the transistor 72 in its associated mirror path 64.

Stated otherwise, this forces the current sink in path 66 to have essentially all the current while the current sink in path 64 has very little, thereby resulting in a rapid charge of capacitor 16. With rapid capacitor charging, the magnitude of the dc voltage offset will rapidly decrease, and thus cause the difference currents in both paths to return to normal, or that is, to an essentially equal condition. Consequently, this fast charging arrangement reduces the blank time prior to effective recovery of data signals upon initial activation in the reading mode.

In effect, the feedback network 56 adjusts the difference current in current network 58 for each current mirror until the dc voltage differential of the amplifier output is reduced to substantially zero. Then, once initial charging is complete, any slight inequality in these difference currents are caused by the feedback network 56 correcting for a slight dc offset, or for process mismatches.

Turning now to the thermal asperity compensator 60, it can be seen in FIG. 2 to include a threshold detector 126 and a signal generator 128. Additionally, a variable timer 130 is also coupled to the signal generator 128 such that the generator can be controlled by either the detector 126, or the timer 130, to deliver a predetermined signal to the shunt transistor 100 to turn it off, or that is, to render it essentially nonconductive. As will be subsequently explained, turning off the shunt transistor following the initial start up of read operations, will alter the ac filtering of the differential amplifier 52 so as to reduce the effects of a thermal asperity, whereas turning off the shunt transistor during initial circuit activation will very rapidly increase the dc charging current and more quickly drive the circuit 50 to an essentially zero dc voltage offset condition.

Thus, in the preferred embodiment, the signal generator 128 is triggered by both the threshold detector 126 to control thermal asperities by altering the filter characteristics of the circuit, and also by the timer 130 to force more rapid capacitor charging during switching to read operations. This rapid charging function during start up, will be later described in more detail in regard to FIGS. 3 and 4.

As indicated, the transistor 100 is normally conductive such that it shunts the current paths 68, 70 just above the resistors 97 and 99 which makes them act as a single resistor. Conversely however, when the signal from signal generator 128 is present and transistor 100 is disabled, the currents in the paths 68 and 70 now bypass the shunt whereby the resistors 97 and 99 act as two separate resistors.

Stated otherwise, opening the normally conductive shunt transistor I 00 alters the previously shunted paths 68, 70 such that they then separately include the resistors 97 and 99, respectively. This shifts the ac virtual ground from a point just above the resistors 97, 99 to below these resistors, and thus, increases the ac gain of the current network 58 and reduces the impedance seen by capacitor 16.

Consequently, this raises the lower corner frequency of the filter, formed by the differential amplifier 52 and the feedback loop 54, and thus filters out lower frequencies. This will aid in recovering data, since the waveform in the differential amplifier 52 during a thermal asperity is a composite of relatively high frequency data signals riding on a low frequency thermal asperity signal. Thus, the shunt transistor 100, controllable by the given signal from the thermal asperity compensator 60 in conjunction with its connection across the paths 68 and 70 provides means for both increasing the ac gain of a portion of the feedback loop as well as for altering the resistance of current network 58 so as to increase the current differential in the current paths in a manner to initially more rapidly charge the capacitor 16.

Now, the threshold detector 126 is a conventional voltage comparator, suitable for the triggering the signal generator 128 when the differential amplitude of the voltage between the outputs leads 76, 78 reaches a predetermined voltage level. Hence, once the select magnitude is reached, the detector triggers the signal generator to open the FET transistor 100, thereby allowing currents in the paths 68 and 70 to bypass the shunt effect previously provided. While there can be many different arrangements for producing the transistor signal, in this embodiment the signal generator 128 provides its signal to the shunt transistor only so long as the generator continues to receive a trigger pulse. Consequently, the signal from the generator ceases, and the shunt transistor 100 is again allowed to turn on, once the differential voltage received by the detector 126 falls below the given threshold value.

The threshold voltage designed to cause activation of signal generator 128 by detector 126, is a voltage level generally much less than the overall voltage amplitude anticipated when a thermal asperity occurs. For example, the threshold of detector 126 is preferably set to a value in the order of 300 millivolts. So, once the voltage differential of the output of amplifier 18 reaches this magnitude, the detector 126 triggers the signal generator 128 to deliver its signal to the shunt transistor 100, and then continues to activate the signal generator until the differential output from amplifier 18 again drops below the threshold value.

In addition to increasing the ac gain, responsive to opening of the shunt transistor 100, the dc difference currents in the mirror paths 68, 70 are also altered since these paths then respectively include the resistors 97 and 99. This arrangement, in turn, will increase the difference currents in the now altered current network 56 as well as their mirror currents in the differential paths 64 and 66, to force more rapid initial charging of the capacitor.

Advantageously, the just noted dc current change is employed in the preferred embodiment to reduce the recovery times following switching to the read mode. This is accomplished by utilizing the signal generator 128 to open shunt transistor 100 during initial circuit activation, independent of thermal asperity detection. To this end, the variable timer 130 is configured for providing a trigger pulse (not shown) of select duration, for example, one microsecond, to the signal generator 128 to cause the latter to open transistor 100 for that duration.

Preferably, the duration of the trigger pulse is varied by a set signal in accordance with the particular circuit considerations of the customer. For example, the pulse duration may be varied in this embodiment from 0.250 to more than one microsecond depending upon the capacitor employed by the customer or the selected transition to the read mode, etc. Consequently, the shunt transistor 100 is preferably rendered nonconductive at activation of the circuit to the read mode so as to provide a more rapid charging of the capacitor 16 and a quick reduction of the circuit's dc voltage offset, as can be seen in the graphs of FIGS. 3–4.

Figure 3:
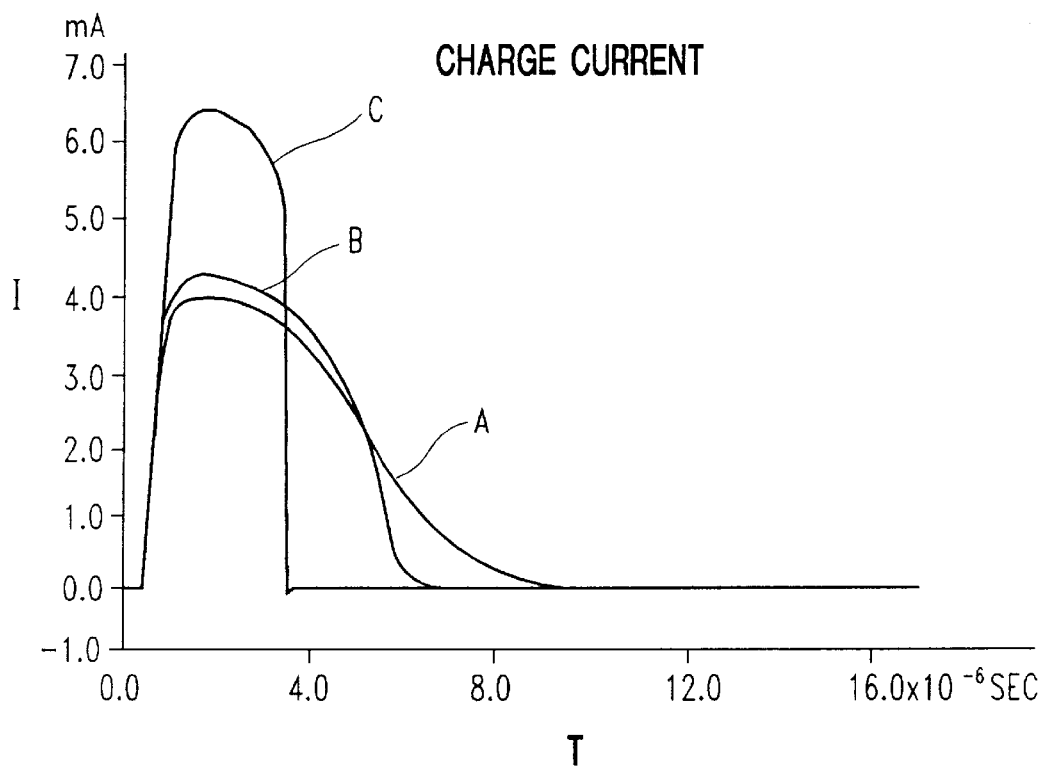
FIG. 3 is a graph comparing charging currents versus time achievable during initial activation of the reading circuit of FIG. 2 to the charging current of the prior art circuit of FIG. 1.
Figure 4:
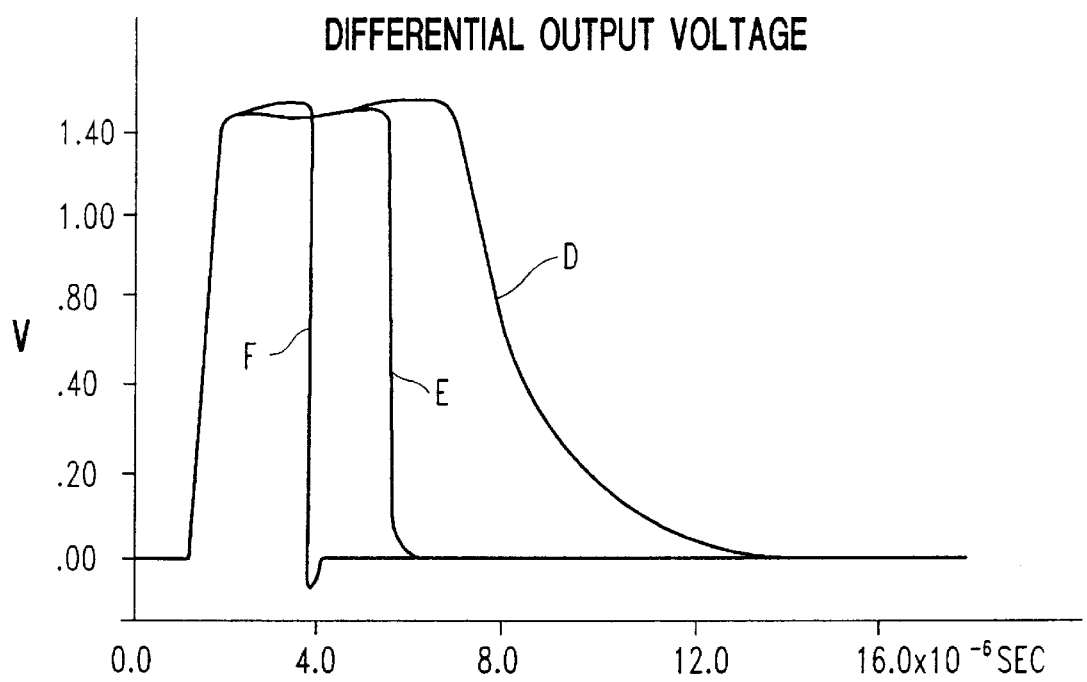
FIG. 4 is a graph comparing voltage outputs versus time achievable during initial activation of the reading circuit of FIG. 2 to that of the voltage output of the prior art circuit of FIG. 1.

Prior to discussing the FIGS. 3–4 in detail, it should be explained that the intermediate curves illustrated therein and designated as curves B and E, are simply included to clarify the inventive circuit's overall operation, and that the curves C and F represent the preferred embodiment of the invention.

Turning now to FIG. 3, wherein the charging currents versus time are graphically illustrated for both the inventive circuit and the prior art circuit during initial activation, it can be seen that curve A, representing the initial charge current in the prior art circuit of FIG. 1, very slowly charges the capacitor 16 as compared to the rapid charging illustrated by the curves B and C, which are representative of the initial charging currents achievable in the inventive circuit of FIG. 2.

In FIG. 3, the initial charging current during activation of circuit 50, when the shunt transistor 100 remains conductive, is shown at B, and the initial charging current during circuit activation with operation of the signal generator 128 to render the shunt transistor nonconductive, is illustrated at C. Thus, as can be seen in this figure, while the charging current illustrated by the curve B, exceeds that of the prior art current represented by A, an even more rapid charging of the capacitor and a still more quick return to a substantially zero dc voltage offset is achieved in the preferred embodiment by opening the shunt transistor during initial activation.

The advantages illustrated in FIG. 3, are depicted in a different manner in FIG. 4 which graphically illustrates the different voltage responses versus time at the output of circuit 50, which may be achieved during initial start up, in comparison with the voltage response of the prior art circuit. In this figure, the output voltage of the prior art circuit during initial activation is shown by curve D, the output of the inventive circuit 50 when the shunt transistor 100 is conductive is shown at E, and the proffered output of the inventive circuit when the transistor 100 is nonconductive is illustrated by the curve F.

Hence, as seen in FIG. 4, the dc offset voltage of the circuit 50, just following circuit activation, as shown by the curve F will quickly drop to a low level as compared to the slow voltage recovery by the prior art as depicted in curve D. Thus, it should be understood that operation at start up of the timer 130 in circuit 50, and the resulting opening of the shunt transistor 100, will rapidly charge the capacitor and reduce the dc voltage offset so as to permit early data recovery. As illustrated by curve F, the inventive circuit provides a most rapid recovery at start up when the shunt transistor 100 is rendered nonconductive at, or just following, circuit activation.

Many different arrangements may be utilized to provide the quick charge and thermal asperity compensation. For example, the threshold detector 126 may be combined with the signal generator 128, or both with the variable timer 130. Additionally, while not preferred, the shunting transistor 100, once rendered nonconductive by the timer 128, may alternately be switched back to its conductive state by the detector 126 when its voltage input drops back to the threshold value of 300 millivolts.

Now, it should also be noted that in the preferred embodiment, the feedback loop 54 is coupled to the output of amplifier 18, and while this is of some importance for efficiently detecting a strong signal representing the occurrence of a thermal asperity, it should be realized that the feedback loop 54 could, in some arrangements, be more directly coupled to the differential amplifier 52. Hence, the circuit 50 could be modified such that at least parts of the feedback loop can receive output signals more directly from the differential amplifier 52 prior to, or without the aid of, the amplifier 18.

This completes the description of the preferred embodiment of the invention. Since changes may be made in the above construction and method without departing from the scope of the invention described herein, it is intended that all the matter contained in the above description or shown in the accompanying drawings shall be interpreted in an illustrative and not in a limiting sense. Thus other alternatives and modifications will now become apparent to those skilled in the art without departing from the spirit and scope of the invention as set forth in the following claims.

What is claimed is:

1. A read circuit configured for operating a magneto-resistive head to enable reading of stored data in accordance with variations in resistance of the magneto-resistive head, said circuit comprising:

a differential amplifier having a pair of parallel, differential amplifier paths;

means for coupling a magneto-resistive head across said differential amplifier paths;

means for coupling a dc bias to said differential amplifier paths for applying a dc bias current to said head to produce data signals in said differential amplifier paths responsive to variations in head resistance due to its sensing of stored data, said bias current providing a dc voltage offset between said differential paths;

a dc capacitor coupled across said differential amplifier paths in parallel to the head to substantially eliminate said dc voltage offset in said differential amplifier once said capacitor becomes fully charged;

a feedback loop configured for evaluating the differential voltage between said differential paths and for controlling the current in at least portions of each of said differential paths to rapidly charge said capacitor to thereby rapidly reduce the dc voltage offset therebetween.

2. The circuit of claim 1 wherein said feedback loop further includes a threshold detector coupled to said differential amplifier and configured for producing a given signal when the magnitude of the voltage differential in said differential amplifier exceeds a predetermined value, and means responsive to said given signal for increasing the ac gain of at least a portion of the feedback loop to thereby raise the lower corner frequency of said differential amplifier and filter out the low frequency of the waveform of a thermal asperity.

3. The circuit of claim 1 including an amplifier connected to said differential amplifier for amplifying its differential voltage signals and for providing an amplified differential output therefrom, and said feedback loop is coupled to the output of said amplifier and configured for evaluating the dc voltage differential therein and for controlling the current in each of said differential paths of said differential amplifier to rapidly reduce the dc voltage offset therebetween.

4. The circuit of claim 1 including an amplifier connected to said differential amplifier for amplifying its differential voltage signals and for providing an amplified output therefrom, and said feedback loop is coupled to said output and includes a threshold detector configured for producing a given signal when the magnitude of the voltage differential of said output exceeds a predetermined threshold value, and said feedback loop further includes means responsive to said given signal for increasing the AC gain of at least a portion of the feedback loop to thereby raise the lower corner frequency of said differential amplifier and filter out the low frequency of the waveform of a thermal asperity.

5. The circuit of claim 1 wherein said feedback loop includes a feedback network configured for evaluating the dc voltage differential of said differential amplifier paths, and said feedback loop including a current network having a pair of parallel current network paths, said feedback network being connected to said current network paths to provide a difference current in each of said current network paths representing the dc voltage of said differential paths, and each said current network path being coupled to a respective one of said differential amplifier paths to make its associated differential path a current mirror therewith so as to control the current in portions of each associated differential amplifier path in a manner to rapidly charge the capacitor and quickly reduce the dc voltage offset of said differential amplifier paths.

6. The circuit of claim 5 wherein said feedback loop further includes a thermal asperity compensator coupled to said differential amplifier and configured for producing a given signal when the magnitude of the voltage differential in said differential amplifier exceeds a predetermined threshold value, and means responsive to said given signal for increasing the ac gain of at least a portion of said current network to thereby raise the lower corner frequency of said differential amplifier and filter out the relatively low frequency waveform of a thermal asperity.

7. The circuit of claim 6 wherein said circuit includes an amplifier connected to said differential amplifier for amplifying its differential voltage signals and for delivering an amplified output thereof to a pair of output leads, and said feedback loop includes a current network having a pair of parallel current paths, and a feedback network coupled to said output leads for evaluating the dc voltage differential thereof and also to said current paths to provide a current in each of said current paths representing the dc voltage difference between said output leads, and each said current path being coupled to a respective one of said differential amplifier paths to make its associated differential path a current mirror therewith, and said means responsive to said given signal includes a shunt transistor mounted across said current paths and being responsive to said given signal for opening said shunt transistor so as to increase the ac gain of said current network and thereby raise the lower corner frequency of the differential amplifier so as to filter out the relatively low frequency of the waveform of a thermal asperity.

8. The circuit of claim 1 wherein said circuit includes an amplifier connected to said differential amplifier for amplifying its differential voltage signals and for delivering an amplified output thereof to a pair of output leads, and said feedback loop is coupled to said output leads and is configured for evaluating the dc voltage differential thereof, and said feedback loop further includes a current network having a pair of parallel current paths, said feedback network being connected to said current paths to provide a current in each representing the dc voltage difference between said differential paths, and each said current path being coupled to a respective one of said differential amplifier paths to make its associated differential path a current mirror therewith so as to thereby control the current in each of said associated differential amplifier path in a manner to rapidly charge said capacitor during circuit activation and quickly reduce the dc voltage offset therebetween.

9. The circuit of claim 8 wherein said feedback loop includes means responsive to circuit activation to the read mode for actuating said signal generator to produce a predetermined signal, said current network includes parallel current paths and means responsive to said predetermined signal for altering the resistance of said current paths so as to control the current in each of said associated differential amplifier path in a manner to rapidly charge said capacitor during circuit activation and thereby reduce its charge time.

10. The circuit of claim 9 wherein said means for altering the resistance of said current paths includes a shunting switch coupled across said current paths in shunting arrangement thereto, and said switch is operable to an open condition in response to said given signal so as to control the current in each of said associated differential amplifier paths in a manner to rapidly charge said capacitor during circuit activation and reduce the dc voltage offset therebetween.

11. The circuit of claim 9 wherein said feedback loop includes a thermal asperity compensator which includes a signal generator and a threshold detector, said threshold detector being coupled to said output leads and configured, when the magnitude of said voltage differential exceeds a given threshold value, for triggering said signal generator to produce a given signal, and said current network includes means responsive to said given signal for increasing the ac gain of said current network to thereby raise the lower corner frequency of said differential amplifier and filter out the relatively low frequency of the thermal asperity waveform.

12. The circuit of claim 11 wherein said current network includes parallel current paths, and said means responsive to said given signal for increasing the ac gain includes a switch coupled across said current paths in shunting arrangement thereto, and said switch arrangement is operable in response to said given signal to open said switch to increase the ac gain of said current network and thereby raise the lower corner frequency of said differential amplifier.

13. The circuit of claim 12 wherein said means for raising the ac gain of said current paths includes a shunting switch coupled across said current paths in shunting arrangement thereto, and said switch is also operable to an open condition responsive to initiation of circuit activation so as to thereby alter the resistance in said current paths and the current in each and their associated differential paths in a manner to rapidly charge said capacitor during said circuit activation.

14. A circuit for reading stored data in accordance with variations in resistance of a magneto-resistive head, said circuit comprising:

a differential amplifier having a pair of parallel differential amplifier paths;

means for coupling a magneto-resistive head across said differential paths;

means for coupling a dc bias to said differential amplifier paths for applying a dc bias current to said head to thereby produce data signals in said differential amplifier paths responsive to variations in head resistance due to its sensing of stored data, said bias current providing a dc voltage offset between said differential paths;

an amplifier connected to said differential amplifier for amplifying and delivering the differential signals thereof to an output of said amplifier;

a feedback loop coupled to said output and to said differential amplifier for controlling said differential amplifier in a manner to reduce the dc voltage offset therein during activation, and said feedback loop further includes a thermal asperity compensator having a signal generator and a threshold detector, said threshold detector being coupled to said output and configured for triggering said signal generator for producing a predetermined signal when the magnitude of the voltage differential in said output exceeds a given threshold value, and said feedback loop further includes means responsive to said predetermined signal for increasing the ac gain of at least a portion of said feedback loop to thereby raise the lower corner frequency of the differential amplifier and filter out the relatively low frequency of the thermal asperity waveform.

15. A circuit for reading stored data in accordance with variations in resistance of a magneto-resistive head, said circuit comprising:

a differential amplifier having a pair of parallel differential amplifier paths;

means for coupling a magneto-resistive head across said differential amplifier paths;

means for coupling a dc bias to said differential amplifier paths for applying a dc bias current to said head so as to produce data signals in said differential amplifier paths responsive to variations in head resistance due to its sensing of stored data, said bias current providing a dc voltage offset between said differential paths;

a dc capacitor coupled between said differential paths in parallel to said means for coupling said head across said differential paths so as to essentially eliminate said dc voltage offset therein when said capacitor is fully charged;

a feedback loop configured for evaluating the differential voltage between said differential paths and for controlling the current therein to reduce the dc voltage offset there between such that said capacitor is rapidly brought to a fully charged condition upon activation of said circuit.

* * * * *